W. J. MASON.
HORSE TAIL TETHER.
APPLICATION FILED MAR. 10, 1908.

940,937.

Patented Nov. 23, 1909.

Witnesses
F. C. Gibson.

Inventor
William J. Mason.
By Victor J. Evans
Attorney

UNITED STATES PATENT OFFICE.

WILLIAM JOSEPH MASON, OF DAPHNE, ALABAMA.

HORSE-TAIL TETHER.

940,937.

Specification of Letters Patent.   Patented Nov. 23, 1909.

Application filed March 10, 1908.   Serial No. 420,243.

*To all whom it may concern:*

Be it known that I, WILLIAM JOSEPH MASON, a citizen of the United States, residing at Daphne, in the county of Baldwin and State of Alabama, have invented new and useful Improvements in Horse-Tail Tethers, of which the following is a specification.

This invention relates to horse-tail tether attachments for harness, and the object of the invention is to provide a device of this character which will be extremely simple in construction, adjustable to the various sizes of horses' tails, and which will allow the animal's tail a certain amount of freedom, but will effectively prevent the animal from switching his tail over the reins of the harness or the dash board of the vehicle to which the animal is attached.

To these ends the invention resides in the novel construction of devices and their arrangement in operative combination, hereinafter fully described and claimed.

Figure 1:
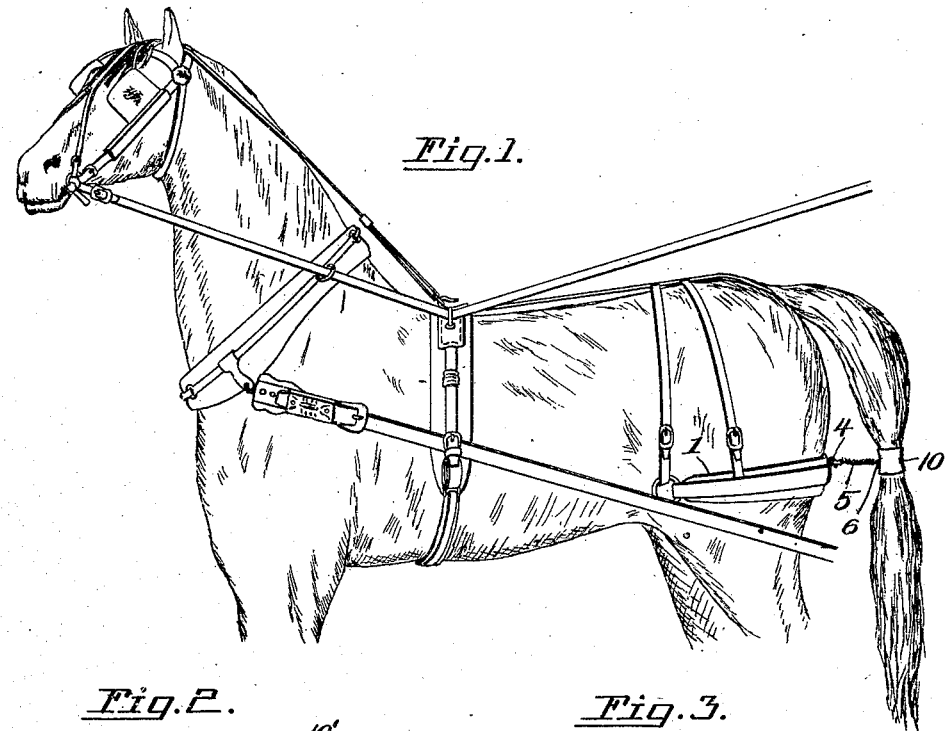
Figure 2:
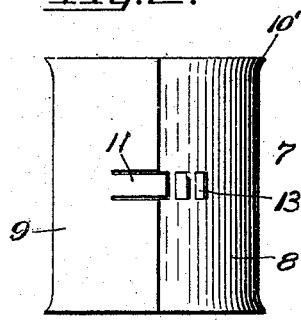
Figure 3:
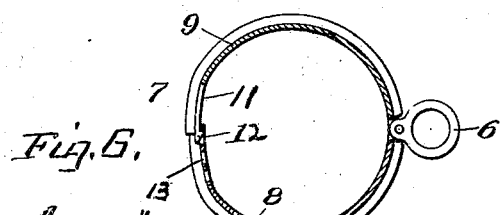
Figure 4:
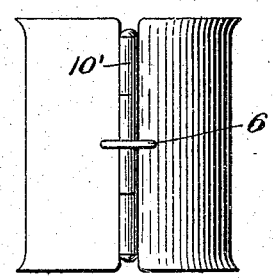
Figure 6:
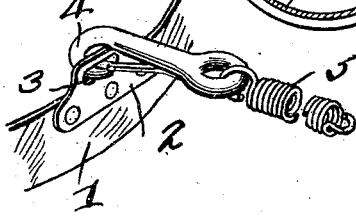
Figure 5:
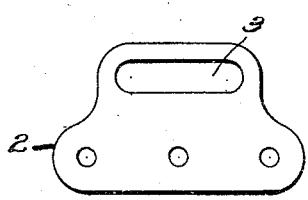

In the accompanying drawings, Figure 1 is a view of my attachment in applied position upon a horse. Fig. 2 is a front elevation of the hinged collar. Fig. 3 is a central longitudinal section of the same. Fig. 4 is a rear elevation of the collar. Fig. 5 is a plan view of the clip adapted for attachment to the hold back band of the breeching. Fig. 6 is an enlarged detail perspective of the plate and the spring catch thereof.

In the accompanying drawings the numeral 1 designates the hold back band of a breeching of an ordinary harness. This breeching band 1 is provided with a metallic plate or clip 2, provided with a body member having openings adapted for the reception of rivets, or similar devices by which it is attached and also provided with an upstanding portion or ear having an elongated slot 3. This slotted portion 3 of the clip is adapted for the reception of a spring catch 4, attached to a resilient member 5, preferably comprising a coiled spring. The opposite end of this resilient member 5 is attached to a ring 6 secured upon the tail securing member 7. This member 7 comprises an elongated tube or collar, constructed of two members 8 and 9 hingedly secured together as at 10. The member 7 has its edges preferably flaring as at 10′ to conform to the shape of the horse's tail. The member 9 is provided with a projecting tongue 11 having its end bent to form a lip or catch 12, and this tongue 11 is preferably provided by slitting the member 9. The member 8 is provided with a series of apertures 13, in direct alinement with the tongue 11, and adapted for engagement upon their inner walls with the catch 12 of the tongue.

From the above description it will be seen that I have provided a single, cheap and effective tether for horses' tails, the clip of which is adapted to remain a permanent member of the hold back of a breeching, the element 7 may be readily detached from the clip by simply releasing the spring catch 4. The member 7 is readily applicable to various sizes of horses' tails by simply adjusting the catch 12 in any of the series of openings 13.

It will be further noted that by providing the attaching plate 2 with the elongated slot 3 the resilient member 5 is afforded a limited movement, which while allowing for a certain amount of freedom of movement of the horse's tail, effectively prevents the horse from switching his tail across the dash board of the vehicle or into contact with the reins of the harness.

Having thus fully described the invention what is claimed as new is:

In a device for the purpose set forth, the combination with a plate having an elongated slot adapted to be secured to the breeching strap of a harness, a snap hook provided with a resilient element connected with the slot of the plate, a tail engaging member connected with the resilient element, said engaging member comprising a pair of semi-cylindrical elements hingedly connected together and having their ends flared outwardly, one of said elements having its body portion provided with spaced slits and the tongue provided by the slits having its end bent inwardly to form a hook, and the opposite element having its body portion provided with spaced cut away portions adapted to be engaged by the said hook.

In testimony whereof I affix my signature in presence of two witnesses.

WILLIAM JOSEPH MASON.

Witnesses:
L. J. BUGG,
J. E. LOZENBY.